United States Patent
Cameron et al.

(10) Patent No.: US 7,396,503 B2
(45) Date of Patent: Jul. 8, 2008

(54) LANCE FOR INJECTING PARTICULATE MATERIAL INTO LIQUID METAL

(75) Inventors: Andrew Miller Cameron, Tansley, Matlock (GB); Christian Juan Feldermann, Banyoles (ES)

(73) Assignee: The BOC Group plc (GB)

( * ) Notice: Subject to any disclaimer, the term of this patent is extended or adjusted under 35 U.S.C. 154(b) by 187 days.

(21) Appl. No.: 10/512,186

(22) PCT Filed: Apr. 15, 2003

(86) PCT No.: PCT/GB03/01602
§ 371 (c)(1),
(2), (4) Date: May 5, 2005

(87) PCT Pub. No.: WO03/091460

PCT Pub. Date: Nov. 6, 2003

(65) Prior Publication Data
US 2005/0230885 A1    Oct. 20, 2005

(30) Foreign Application Priority Data
Apr. 24, 2002  (GB)  ................. 0209364.9

(51) Int. Cl.
*C21C 5/46*    (2006.01)

(52) U.S. Cl. .................... 266/225; 266/270

(58) Field of Classification Search .......... 266/225, 266/270
See application file for complete search history.

(56) References Cited

U.S. PATENT DOCUMENTS

| 5,227,118 | A | 7/1993 | Bleser et al. |
|---|---|---|---|
| 6,244,854 | B1 | 6/2001 | Satchell, Jr. |
| 6,250,915 | B1 | 6/2001 | Satchell, Jr. |
| 6,254,679 | B1 | 7/2001 | Sancenot et al. |
| 6,322,610 | B1 * | 11/2001 | Pavlicevic et al. ............ 266/225 |
| 6,368,550 | B1 * | 4/2002 | Wagener et al. ............. 266/225 |
| 6,432,165 | B1 * | 8/2002 | Dittrich et al. ................ 266/44 |
| 6,558,614 | B1 * | 5/2003 | Fritz .......................... 266/225 |
| 2002/0035892 | A1 | 3/2002 | Laurent et al. |

FOREIGN PATENT DOCUMENTS

| EP | 0 081448 | 9/1986 |
|---|---|---|
| EP | 0 0965 649 | 12/1999 |
| GB | 1 015 581 | 1/1966 |
| JP | 06-138853 | 1/1996 |
| JP | 08 003618 | 1/1996 |

OTHER PUBLICATIONS

EPO Search Report; Dated Jun. 27 2003; Performed by Authorized Officer; G. Badcock.

* cited by examiner

*Primary Examiner*—Scott Kastler
(74) *Attorney, Agent, or Firm*—Joshua L. Cohen

(57) ABSTRACT

A metallurgical lance for injecting particulate material into a liquid comprises a main gas tube 6 defining an axial main gas passage terminating at its outlet and in a first Laval nozzle 38 downstream of the throat of said nozzle. A shrouding gas passage in the form of a combustion chamber 36 surrounds the main gas tube and terminates in a second Laval nozzle 42. A particulate material transport tube 4 defines a passage for the particulate material to be introduced into the first Laval nozzle 38 downstream of its throat. The first Laval nozzle 38 is provided with a passage 40 for the flow of coolant.

5 Claims, 2 Drawing Sheets

LANCE FOR INJECTING PARTICULATE MATERIAL INTO LIQUID METAL

Figure 1:
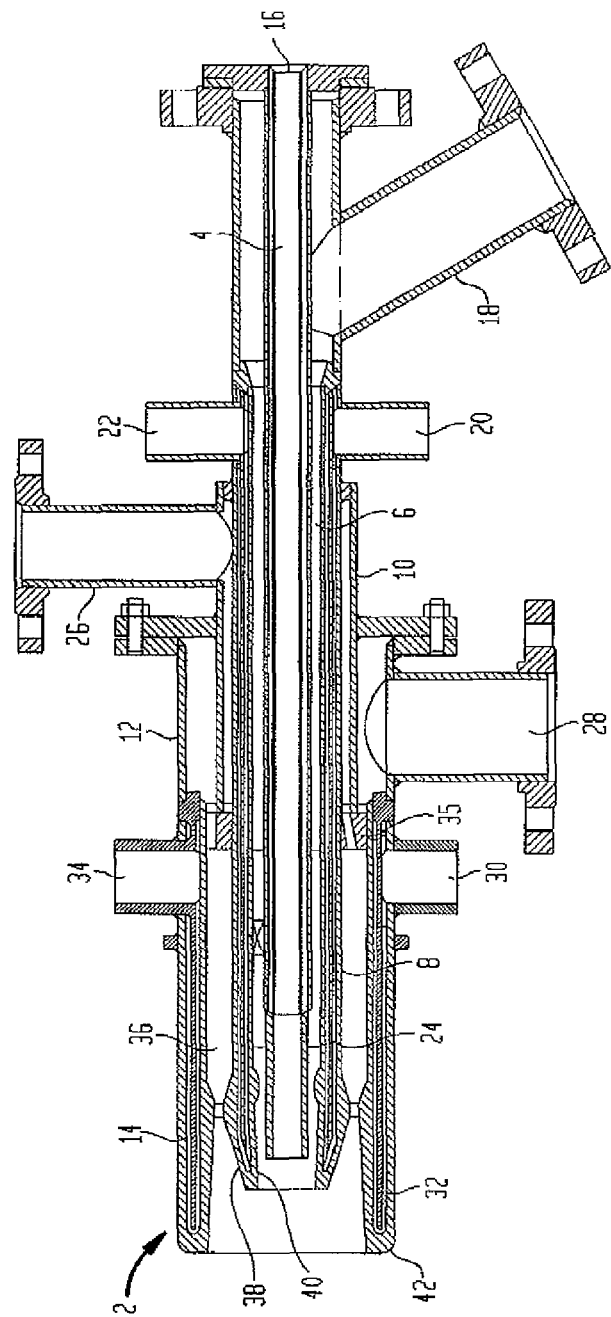

This invention relates to a metallurgical lance for injecting particulate material into a liquid.

It is well known in metallurgical processes to inject gas and solids into a volume of molten metal. For example, particulate carbon can be injected into a furnace so as to participate in the refining of iron or steel or a non-ferrous metal. Typically, the particulate material is injected into the furnace in a carrier gas. The carrier gas may be non-reactive in the furnace or may be a reactive gas such as oxygen.

In order to obtain adequate penetration of the particulate material into the molten metal, it is desirable to inject it at high velocity. The rate of attenuation of a high velocity jet of gas as it travels through a still atmosphere is, however, quite high. It is therefore desirable to have the outlet of a lance through which the particulate material is injected in a situation quite near to the surface of the molten metal. Alternatively, it is desirable to utilise a lance configuration which ensures that the rate of attenuation of the carrier gas jet is relatively low. Choosing an appropriate configuration for the lance is often particularly important in a metallurgical environment in which if the distal end of the lance is located too near the surface of the molten metal, it runs the risk of being eroded or otherwise damaged, for example, by splashing molten metal. U.S. Pat. No. 6,254,379 B relates to a method for providing a reagent to a reaction zone. The reagent may be a particulate material and the reaction zone can be formed in a furnace. The method comprises:

(A) providing reagent to a carrier gas and passing reagent-containing carrier gas as a gas jet into an injection space from an injector through a distance (d);
(B) surrounding the gas jet with a flame envelope from the injector through the distance (d) so as to maintain the gas jet coherent through the distance (d);
(C) passing the reagent-containing carrier gas further into the injection space beyond the distance (d) into a reaction zone past the leading edge of the flame envelope as a non-coherent gas stream; and
(D) providing reagent from the non-coherent gas stream to the reaction zone.

In step A of the above method the injector is a Laval nozzle. A Laval nozzle enables a gas jet to be formed at supersonic velocity. A Laval nozzle has in the direction of flow a convergent portion, a throat, and a divergent portion. The reagent is introduced into the nozzle upstream of the throat. This has the disadvantage that damage can be caused to the nozzle.

According to U.S. Pat. No. 6,254,379 B a coherent gas jet is a gas stream whose diameter undergoes no substantial increase along the length of the stream and the rate of entrainment of the surrounding gas into the gas stream is substantially less than that into a non-reacting turbulent jet. The flame envelope which is employed to achieve a degree of coherency of the gas jet is formed by supplying fuel and oxidant to the tip of the injector and allowing the fuel and oxidant to mix in a flame zone downstream of the tip. Although a supersonic gas jet may be employed to carry the reagent, the flame is formed sub-sonically. As a result of the disparity between the velocity of the gas jet and the velocity of the flame, the effectiveness of the latter in reducing the rate of attenuation of the velocity of the jet is diminished.

The above problems are addressed by the metallurgical lance according to the invention.

According to the present invention there is provided a metallurgical lance for injecting particulate material into a liquid, the lance comprising an axial main gas passage terminating at its outlet end in a first Laval nozzle, a shrouding gas passage about the main gas passage terminating at its outlet end in a second Laval nozzle, and a particulate material transport passage having an axial outlet which terminates in the first Laval nozzle downstream of its throat, wherein the first Laval nozzle has at least one cooling passage for the flow of external coolant.

By introducing the particulate material into the main gas jet it is possible to introduce it into the liquid at a high velocity even though the particulate material is typically carried in its transport passage at a sub-sonic velocity. Further, because the particulate material is introduced into the divergent part of the first Laval nozzle, collisions of the particles at high velocity with the walls of the first Laval nozzle can be kept to a minimum, thus minimizing the risk of arising rapid erosion of the nozzle.

Each Laval nozzle has essentially an upstream part that converges towards a throat and a downstream part that diverges from the throat. Optionally, the Laval nozzle may include a further part downstream of the divergent part. The further part may be right cylindrical or may converge again in the direction of flow. The axial outlet of the transport passage may terminate in the divergent part or the further part.

Because the shrouding gas is able to leave the lance at a supersonic velocity, differences in velocity between the shrouding gas and the main gas jet can be kept down with the result that the rate at which the velocity of the main gas jet declines is also kept down.

Another advantage of the metallurgical lance according to the invention, is that it may employ an arrangement of concentric tubes in order to define its various passages. This arrangement facilitates fabrication of the lance.

Preferably, the shrouding gas passage and the particulate material transport passage are coaxial with the main gas passage.

Preferably, the shrouding gas passage comprises a combustion chamber. The combustion chamber preferably has at its distal end an inlet for oxidant and an inlet for fuel. The fuel and oxidant are preferably supplied through coaxial oxidant and fuel passages.

The second Laval nozzle is preferably cooled by means of an external coolant, and also has at least one passage for the flow of external coolant. The external coolant for both Laval nozzles is typically water. Cooling of the first Laval nozzle, in particular, increases the operational life of the metallurgical lance.

The first Laval nozzle is preferably set back relative to the second Laval nozzle, the outlet end of the first Laval nozzle terminating in the divergent part of the second Laval nozzle. Such an arrangement helps to protect the first nozzle from damage by splashing molten metal.

The main gas jet preferably exits the metallurgical lance according to the invention at a velocity in the range of Mach 1.5 to Mach 4. The shrouding gas, preferably a combusting gas mixture, leaves the lance at a velocity in the range of 100 to 110% of the velocity of the main gas jet.

Typically, the main gas jet is commercially pure oxygen or oxygen-enriched air. The particulate material may be, for example, carbon.

Figure 2:
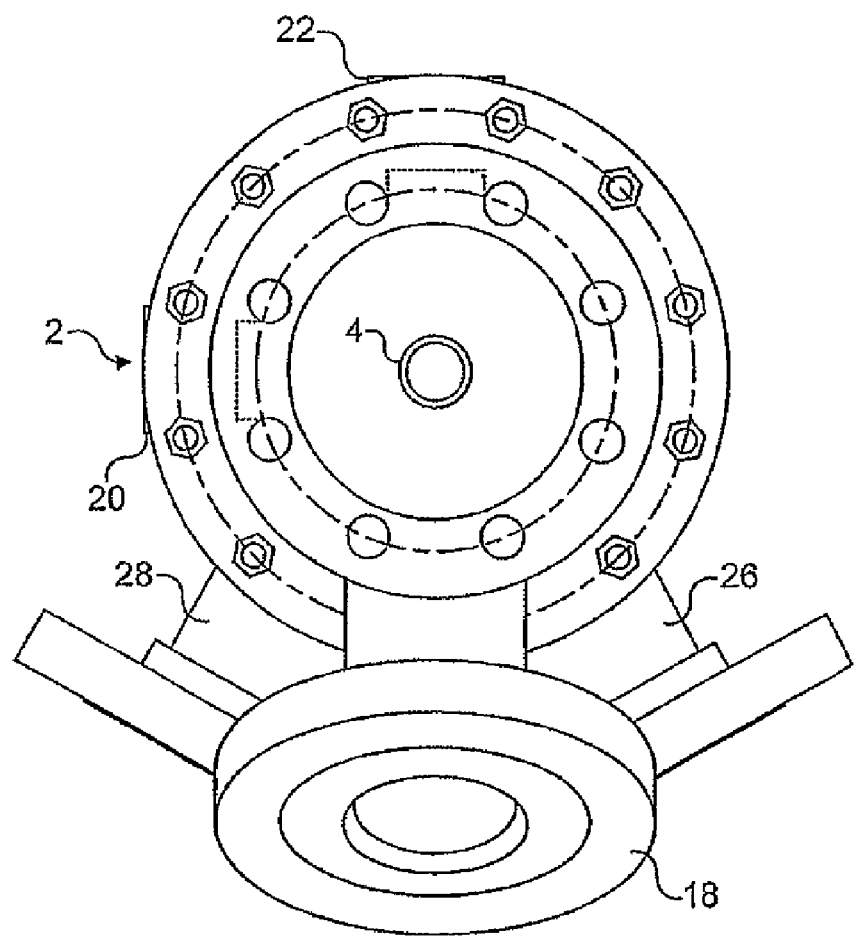

A metallurgical lance according to the invention will now be described by way of example with reference to the accompanying drawings, in which: FIG. 1 is a side elevation, partly in section, of the lance, and FIG. 2 is a view of the lance shown in FIG. 1 from its proximal end.

Referring to the drawings, the metallurgical lance 2 comprises an array of six coaxial tubes or pipes. In sequence, from the innermost tube to the outermost tube, there is a particulate material transport tube 4, a main gas tube 6, an inner tube 8 for water, a tube 10 for fuel gas, a tube 12 for oxidant and an outer tube 14 for water. Each of the tubes 4, 6, 8, 10, 12 and 14 has an inlet at or near the proximal end of the lance 2. In addition, there are outlets from the inner water tube 8 and the outer water tube 14. Thus, there is an axial inlet 16 at the proximal end of the lance 2 for a carrier gas, typically air, employed to transport the particulate material to the distal end of the lance 2. The inlet 16 may include passages (not shown) for introducing the particulate material into the carrier gas. The carrier gas may be supplied at a relatively low pressure such that its velocity along the particulate material transport tube is no more than about 100 metres per second and the particulate material is carried therein as a dilute phase. Alternatively, the particulate material may be transported as a dense phase in a high pressure carrier gas. The latter kind of transport is preferred for abrasive particles, the former for softer particles.

The main gas tube 6 has an inlet 18. Typically, the main gas is oxygen or oxygen-enriched air and the inlet 18 communicates with a source (not shown) of such oxygen or oxygen-enriched air. The inner water tube 8 has an inlet 20 and an outlet 22 for the water. The tube 8 is provided with a tubular baffle 24. In operation, cooling water passes over the outside surface of the baffle 24 as it flows from the proximal to the distal end of the lance 2 and returns in the opposite direction to the outlet 22 over the inner surface of the baffle 24. The provision of the inner cooling water protects the inner parts of the lance 2 from the effects of the high temperature environment in which it operates.

The fuel gas tube 10 communicates at its proximal end through an inlet 26 with a source (not shown) of fuel gas (typically, natural gas). Similarly, an inlet 28 places the oxidant tube 12 in communication with a source (not shown) of oxidant, typically oxygen or oxygen-enriched air. The outer water tube 14 communicates at its distal end with another inlet 30 for cooling water. The outer tube 14 contains a tubular baffle 32. The arrangement is such that coolant water flows through the inlet 30 and passes over the outer surface of the baffle 32 as it flows from the proximal to the distal end of the lance 2. The cooling water returns in the opposite direction and flows away through an outlet 34 at the proximal end of the lance 2. The outer water tube 14 enables the outer parts of the lance 2 to be cooled during its operation in a high temperature environment. The fuel gas tube 10 and the oxidant tube 12 terminate further away than the other tubes from the distal end of the lance 2. The tubes 10 and 12 terminate in a nozzle 35 at the proximal end of an annular combustion chamber 36. In operation, the oxidant and fuel gas are supplied at elevated pressure, typically in the order of 5 bar for the natural gas and 11 bar for the oxygen, and pass through the nozzle 35 and mix and combust in the combustion chamber 36. Typically, the oxidant (oxygen) and the fuel gas are supplied at rates so as to give stoichiometric combustion, although if desired, the fuel gas and the oxidant may be supplied at rates so as to give an excess of fuel gas or an excess of oxidant in the flame.

The main gas tube 6 provides the passage for the main gas flow through the lance 2. The main gas tube 6 terminates in a first or inner Laval nozzle 38. The first Laval nozzle 38 has an annular cooling passage 40 formed therein. The cooling passage 40 is contiguous to an inner water passage defined between the inner surface of the tube 8 and the outer surface of the main gas tube 6. The baffle 24 extends into the passage 40 so as to direct the flow of water coolant. The combustion chamber 36 terminates at its distal end in a second or outer Laval nozzle 42. The arrangement of the combustion chamber 36 and the Laval nozzle 42 causes the flame formed in the combustion chamber to be accelerated to a supersonic velocity in operation of the lance 2. The second Laval nozzle 42 is formed as a double-walled member. The outer wall of the second Laval nozzle 42 is contiguous with the distal end of the outermost tube 14. The outermost tube 14 is thus able to provide cooling to the second Laval nozzle 42 in operation of the lance 2, the baffle 32 extending into the annular space defined by the inner and outer walls of the Laval nozzle 42. The first or inner Laval nozzle 38 is set back relative to the second or outer Laval nozzle 42. The outlet of the innermost tube 4 is also set back relative to the tip of the first Laval nozzle 38 and terminates in the divergent portion of the Laval nozzle 38.

In operation, the main gas exits the Laval nozzle 38 typically at a velocity in the range of Mach 2 to Mach 3. Carrier gas containing particulate material passes out of the distal end of the tube 4 into the accelerating main gas jet at a region in the divergent part or (as shown) in a further convergent part of the inner Laval nozzle 38. The particulate material is thus carried out of the Laval nozzle 38 at supersonic velocity. The position of the distal end of the tube 4 is such that although the particulate material is introduced into the main gas jet while the latter is accelerating, there is a minimal attrition of the particles against the walls of the inner Laval nozzle 38. The main gas jet is shrouded by an annular supersonic flow of burning hydrocarbon gas exiting the combustion chamber 36. The exit velocity of the burning hydrocarbon gas flame from the Laval nozzle is typically from 100 to 110% of the exit velocity of the main gas jet. By adopting similar exit velocities, mixing of the main gas jet and its flame shroud is kept down.

The metallurgical lance 2 shown in the drawings is simple to fabricate and may be formed primarily of stainless steel. The Laval nozzles 38 and 42 may be attached to the lance 2 by means of suitable welds. The nozzle 35 at the inlet to the combustion chamber 36 may also be welded into position.

In use, the metallurgical lance is typically positioned with its axis vertical in a position a suitable vertical distance above the surface of a metallurgical liquid (e.g. molten metal) into which it is desired to introduce a chosen particulate material (e.g. carbon). The vertical distance is typically selected such that the particulate material is carried into the molten metal at supersonic velocity. In this way, it is able to penetrate deep into the liquid, thus facilitating its chemical or metallurgical reaction with the liquid.

The invention is claimed is:

1. A metallurgical lance for injecting particulate material into a liquid, the lance comprising an axial main gas passage terminating at a first outlet end in a first Laval nozzle, a shrouding gas passage about the axial main gas passage terminating at a second outlet end in a second Laval nozzle, and a particulate material transport passage having an axial outlet which terminates in the first Laval nozzle downstream of a throat of the first Laval nozzle, wherein the first Laval nozzle has at least one cooling passage for a flow of external coolant and wherein the first Laval nozzle is set back relative to the second Laval nozzle, the first outlet end of the first Laval nozzle terminating in a divergent part of the second Laval nozzle.

2. A metallurgical lance as claimed in claim 1, wherein the shrouding gas passage and the particulate material transport passage are coaxial with the axial main gas passage.

3. A metallurgical lance as claimed in claim 1, wherein the shrouding gas passage comprises a combustion chamber.

4. A metallurgical lance as claimed in claim 1, wherein the second Laval nozzle has at least one cooling passage for a flow of external coolant.

5. A metallurgical lance as claimed in claim 1, wherein the particulate material transport passage terminates at a downstream end of the particulate material transport passage in a divergent part of the first Laval nozzle.

* * * * *